United States Patent [19]
Schein et al.

[11] Patent Number: 6,133,909
[45] Date of Patent: Oct. 17, 2000

[54] METHOD AND APPARATUS FOR SEARCHING A GUIDE USING PROGRAM CHARACTERISTICS

[75] Inventors: Steven Michael Schein, Menlo Park; James Jay Leftwich, Palo Alto, both of Calif.

[73] Assignee: StarSight Telecast, Inc., Fremont, Calif.

[21] Appl. No.: 08/873,916

[22] Filed: Jun. 12, 1997

Related U.S. Application Data

[60] Provisional application No. 60/019,684, Jun. 13, 1996.

[51] Int. Cl.[7] ....................................................... H01H 9/30
[52] U.S. Cl. .............................. 345/327; 348/10; 348/906
[58] Field of Search .................................. 348/1, 10, 906; 455/2; 345/327

[56] References Cited

U.S. PATENT DOCUMENTS

| | | |
|---|---|---|
| 4,425,579 | 1/1984 | Merrell . |
| 4,706,121 | 11/1987 | Young . |
| 5,179,439 | 1/1993 | Hashimoto . |
| 5,223,924 | 6/1993 | Strubbe . |
| 5,231,494 | 7/1993 | Wachob . |
| 5,410,344 | 4/1995 | Graves et al. . |
| 5,469,206 | 11/1995 | Strubbe et al. . |
| 5,483,278 | 1/1996 | Strubbe et al. . |
| 5,526,034 | 6/1996 | Hoarty et al. . |
| 5,534,911 | 7/1996 | Levitan . |
| 5,585,838 | 12/1996 | Lawler et al. . |
| 5,592,551 | 1/1997 | Lett et al. ............................... 348/906 |
| 5,594,509 | 1/1997 | Florin et al. . |
| 5,630,119 | 5/1997 | Aristides et al. ........................ 348/906 |
| 5,635,989 | 6/1997 | Rothmuller ............................. 348/906 |
| 5,671,411 | 9/1997 | Watts et al. ............................. 348/906 |
| 5,758,257 | 5/1998 | Herz et al. .............................. 348/906 |

OTHER PUBLICATIONS

ACM Multimedia 93 Proceedings, "A Digital On–Demand Video Service Supporting Content–Based Queries," Little et al., pp. 427–436, Jul. 1993.

*Primary Examiner*—Andrew I. Faile
*Assistant Examiner*—Kieu-Oanh Bui
*Attorney, Agent, or Firm*—Christie, Parker & Hale, LLP

[57] ABSTRACT

A system and method for obtaining information from an electronic program guide is provided. The electronic program guide can be provided by a television system, a set-top box, a VCR, or a computer system. The interactive system allows the user to quickly identify programs which may be of particular interest, thereby avoiding the necessity of searching through the entire program guide. In one embodiment, after the user identifies a specific program as a favorite, the system asks the user a series of questions in order to identify the particular characteristics of the program which makes it a favorite. Based upon the user's responses, the system identifies all programs which contain the desired characteristics. In another embodiment, whenever the user watches a program the interactive system, operating in the background, searches for and marks all programs which may be of interest to the user. In another embodiment, the user can directly employ the interactive system to search for programs containing desirable characteristics. In this embodiment the user enters certain attributes into the system, for example, particular actors or directors. The system then identifies programs within the available electronic program guide which may meet the user's requirements.

31 Claims, 9 Drawing Sheets

METHOD AND APPARATUS FOR SEARCHING A GUIDE USING PROGRAM CHARACTERISTICS

CROSS REFERENCE TO RELATED APPLICATIONS

This application claims priority from provisional application Serial No. 60/019,684, filed Jun. 13, 1996.

BACKGROUND OF THE INVENTION

The present invention relates generally to a program schedule guide and, more particularly, to a system and process for allowing a television viewer to access on-screen television program listings and other information services in an easy and convenient way.

The number of television channels available to the user has grown dramatically within the last decade, primarily due to the availability of cable and direct broadcast satellite systems. As the number of programs of potential interest to the viewer has increased, a variety of electronic program guides have been developed to help the viewer select programs of particular interest. For example, commonly assigned U.S. Pat. Nos. B1 4,706,121 and 5,353,121 each describe schedule information processing systems which provide the viewer with a convenient way to select programs based on viewer supplied selection criteria.

The system disclosed in U.S. Pat. No. B1 4,706,121 (Young) receives television schedule information as a broadcast. In one embodiment of Young, the television schedule information is provided on the user's television screen. The user can then supply selection criteria which are utilized by the Young system to make program selections, to control the television schedule information displayed on the television screen, etc. In addition, Young discloses a system which controls a television receiver to allow for the automatic user selection of programs and the automatic, unattended recording of programs that are listed in the television schedule information. The automatic, unattended recording of programs is achieved by controlling a video tape recorder (VCR) or other recording device. Young also proposes utilizing a personal computer for the television schedule information.

From the foregoing, it is apparent that improved methods of manipulating the information contained in electronic program guides are desired.

SUMMARY OF THE INVENTION

The present invention provides an interactive system for obtaining information from an electronic program guide. The electronic program guide can be provided by a television system, a set-top box, a VCR, or a computer system. The interactive system allows the user to quickly identify programs which may be of particular interest, thereby avoiding the necessity of searching through the entire program guide.

In one embodiment of the invention, a user identifies a specific program as a favorite. The system then asks the user a series of questions in order to identify the particular characteristics of the specific program which makes the program a favorite. Based upon the user's responses, the system identifies other programs which contain the desired characteristics. The system can be designed to identify desirable programs upon request by the user; automatically utilizing the current program guide data; or automatically utilizing the program guide data, continuously updating the search as the program guide is updated.

In another embodiment of the invention, whenever the user watches a program the interactive system, operating in the background, searches for programs which appear similar to the program currently being watched. If additional programs are found which may be of interest, the system identifies the user by placing a small icon on the screen. In an alternate configuration, if the system identifies additional programs an icon is placed on one of the program guide information screens. Then when the user enters the program guide mode, a quick glance at the screen alerts the user to the possibility of viewing other programs which may be of interest. In another configuration, the system does not present an icon to the user. Instead, one of the categories in the menu guide is FAVORITES. When the FAVORITES category is selected, the system identifies all programs which it previously determined to be of possible interest to the user.

In another embodiment, the user can utilize the interactive system of the invention to find desirable shows. In this embodiment, the user enters certain attributes into the system, for example, particular actors or directors. The system then identifies all programs within the electronic program guide which may meet the user's requirements.

A further understanding of the nature and advantages of the present invention may be realized by reference to the remaining portions of the specification and the drawings.

NOTE: Many of the names in the figures and/or specification may be the trademarks/servicemarks of others. Such names include "IBM", "MACINTOSH," "HBO," "SHO," "PBS," "M.A.S.H.," "I LOVE LUCY," "PRODIGY," "AMERICA ONLINE," "COMPUSERVE," "MSN," "AT&T," "49ER'S," "CASABLANCA," "GIANT'S BASEBALL," "LOUISVILLE SLUGGER," "NIKE," "NIKE SPIKED," "POP WARNER," "LEGENDS OF THE FALL," "SILENCE OF THE LAMBS," "THE TONIGHT SHOW," "NFL," "SEINFELD," "DR. DOOLITTLE," "DR. ZHIVAGO," "DR. JEKYLL AND MR. HYDE," and "DR. STRANGELOVE."

DESCRIPTION OF THE PREFERRED EMBODIMENT

The present invention provides an interactive computer system which assists a user in utilizing television schedule information. In the preferred embodiment, the user can (1) display television schedule information in a desired format on the computer or television screen, (2) select a desired program which is listed in the television schedule information for automatic tuning, and (3) select one or more desired programs which are listed in the television schedule information for automatic, unattended recording. To provide this functionality in the preferred embodiment, the present invention includes a computer system and a television system.

Figure 1:
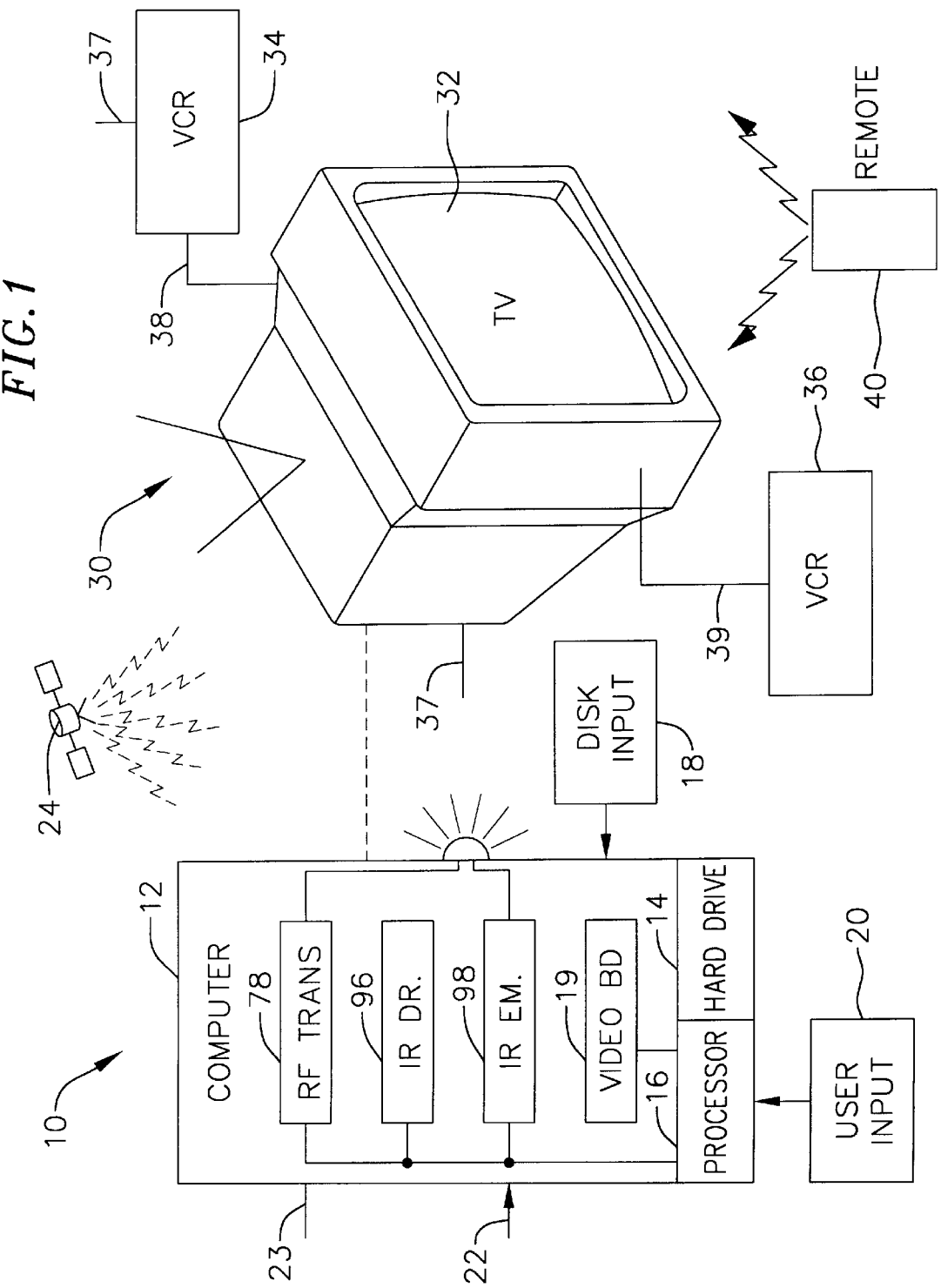
FIG. 1 illustrates a computer system coupled to a television system.

FIG. 1 illustrates a computer system coupled to a television system. In the preferred embodiment, computer system 10 includes standard computer 12 which is, for example, any available personal computer (e.g., IBM compatible, Macintosh, and the like). Computer 12 can also be located within a set-top box (e.g., a DSS box). Computer 12 contains hard drive 14 and processor 16. These units 14 and 16 are usually, automatically included in computer 12. Depending upon the amount of memory required as well as the desired system configuration, hard drive 14 may be replaced with one or more memory chips. Disk input 18 is used to provide computer 12 with various, additional software. User input 20 allows a user to interact with computer 12 and/or the television schedule guide. Line 23 is connected to an available serial, parallel or other data port 23 on computer 12. This line 23 is used to connect other devices/components to computer 12.

Television system 30 includes television 32 which may be any commercially available television. Television system 30 may or may not include a video tape recorder (VCR). In this embodiment, VCRs 34 and 36 are coupled to television 32. These VCRs 34 and 36 can be, for example, any commercially available VCRs or any other type of recording device (analog or digital). User interface device 40 allows a user to interact with, for example, television 32, VCR 34, and/or VCR 36. User interface device 40 can be, for example, a remote control or a voice activated interface. Line 37 is used to connect other devices to VCR 34. Other devices can also be connected in series between VCR 34 and television 32 via line 38. Computer 12 (or computer system 10) and television 32 (or television system 30) can be located in different rooms within a private residence or a commercial building.

In the preferred embodiment, a computer program provided on diskettes, a CD ROM or other medium contains the software needed for receiving, organizing and displaying data for the television schedule guide. These diskettes are inserted in disk input 18 and the software for these diskettes is stored within computer 12 on hard drive 14 or on another mass storage location. This action can be performed by, for example, the user or a serviceperson. The computer program can also be provided, for example, via downloading from a satellite 24, transmission through the internet or other on-line service, or transmission through another type of land line 22 (e.g., coax cable, telephone line, optical fiber, or the like).

In addition to the computer program, data for the basic schedule information and other related data (e.g., data relating to a particular show) are needed for the generation and maintenance of the television schedule guide. These data are received, in the preferred embodiment, via line 22; they can also be provided via a satellite broadcast from satellite 24. Additionally, the television schedule information and related data can be sent directly to television 32 via satellite 24. In this arrangement, the television schedule information and related data does not have to be transmitted from computer system 10 to television system 30.

In the preferred embodiment, line 22 is a telephone line which provides access to the internet or other on-line service via, for example, a regular modem or direct modem access to a schedule provider. The schedule data are then provided via the internet or other on-line service, or directly from the service provider. As stated above, line 22 can also be, for example, coax cable, optical fiber or any other land line which can provide data to computer 12. The software program saved on hard drive 14 then utilizes the data received on line 22 to generate a television schedule guide. The user can retrieve this generated television schedule guide when desired.

Figure 2:
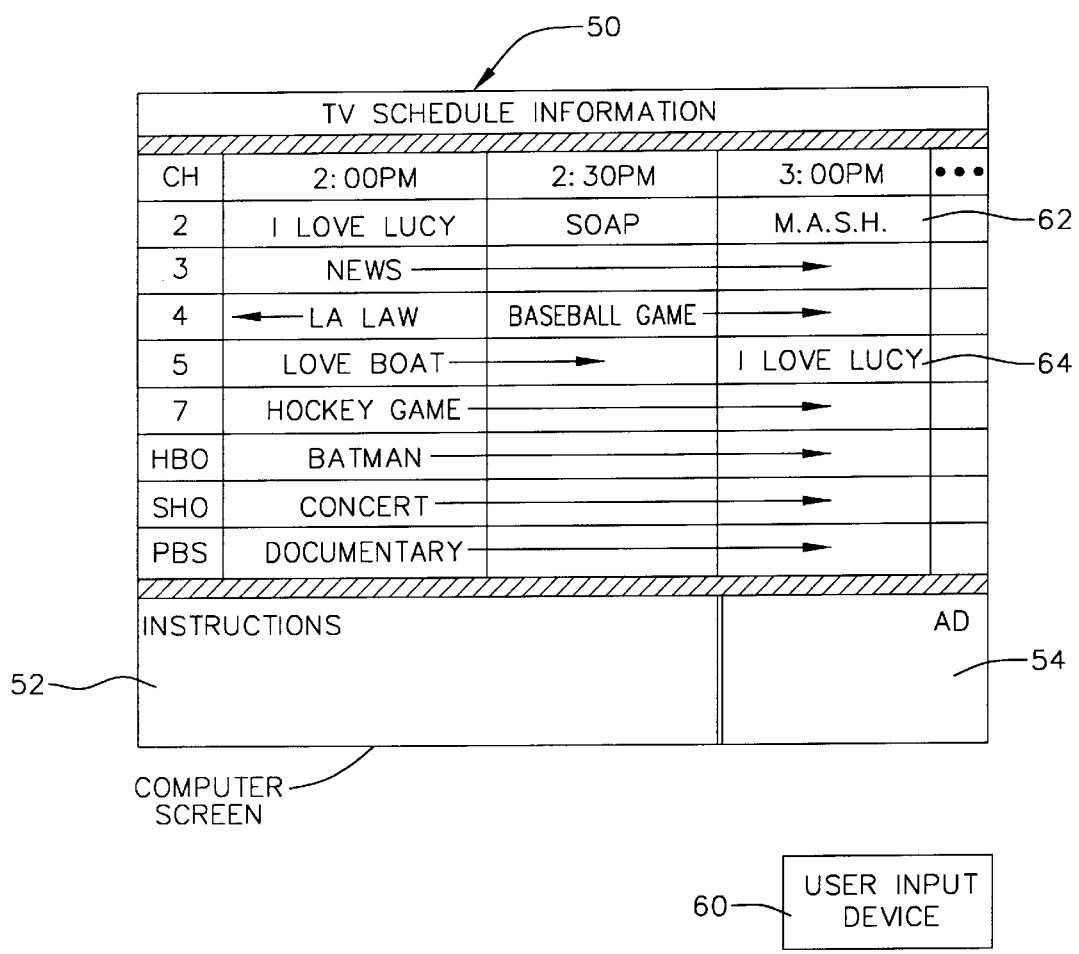
FIG. 2 shows an example of a television schedule guide as displayed on a computer screen along with a user input device.

FIG. 2 shows an example of a television schedule guide as displayed on a computer screen along with a user input device. In the preferred embodiment, the television schedule information is provided in a grid-like display. In this example, various channels are provided on the Y-axis of the grid guide, and various times are provided on the X-axis of the grid guide. This display can also contain special instructions for the user in screen area 52 and advertisements directed to the user in screen area 54. The television schedule guide in FIG. 2 has been customized by a user such that only channels 2, 3, 4, 5, 7, HBO, SHO and PBS are included in the displayed guide. In one embodiment, a television within computer system 10 or television system 30 can be used as computer screen 50.

The user, via input device 60, can scroll throughout the television schedule information provided in the grid guide. User input device 60 can be, for example, a keyboard with arrow keys, a computer pointing device (e.g., a mouse) or a voice recognition input. By utilizing user input device 60, a user can sort, mix, and do a special customized line-up of channels within the television schedule guide displayed on computer screen 50. In addition, the user can automatically tune to a desired program or can select different programs for automatic recording. For more information on automatic tuning and automatic recording, see U.S. Pat. Nos. B1 4,706,121 and 5,353,121 as well as U.S. patent application Ser. No. 08/423,411; these patents and this patent application are, like the present patent application, assigned to Starsight Telecast, Inc. U.S. Pat. Nos. B1 4,706,121 and 5,353,121 and U.S. patent application Ser. No. 08/423,411 are hereby incorporated by reference in their entirety for all purposes.

In another embodiment of the present invention, the computer 12 is equipped with a television/video board that contains a tuner. When this television/video board is located in computer 12, a computer user can view selected television programs/shows on computer monitor 50. Therefore, when a user selects a television program for automatic tuning, the television/video board is tuned to the channel carrying the selected television program such that the selected television program is automatically displayed on computer monitor 50.

In the embodiment of the present invention shown in FIG. 1, two programs provided at the same time can be automatically recorded because two VCRs 34 and 36 are present. The user need only select two programs for recording and the present invention will automatically cause the programs to be recorded when they are aired in an unattended fashion.

The user can also directly select which device or devices will be recording or tuning for each selected program. For example, the user may wish to have M.A.S.H. 62 recorded by VCR 34 and I LOVE LUCY 64 recorded by VCR 36. In this example, the computer software on hard drive 14, at the program start time, (1) tunes VCR 34 to the channel carrying I LOVE LUCY, (2) turns VCR 34 "on", and (3) activates the record function on VCR 34. If I LOVE LUCY starts at the same time as M.A.S.H., the software also, at approximately the same time, (1) tunes VCR 36 to the channel carrying M.A.S.H., (2) turns VCR 36 "on", and (3) activates the record function on VCR 36. At the program end time for M.A.S.H., the software turns "off" the record function, and then turns "off" VCR 34. The same sequence takes place for VCR 36 when the program end time for I LOVE LUCY occurs.

In the preferred embodiment, two electronic devices are used to provide the schedule/control system herein. These two electronic devices allow for the interaction between computer system 10 and television system 30. The first electronic device is a computer accessory and the second is a video tape recorder controller/connector (VCR connector). The second electronic device can also be a television connector, set-top box connector and the like.

Figure 3:
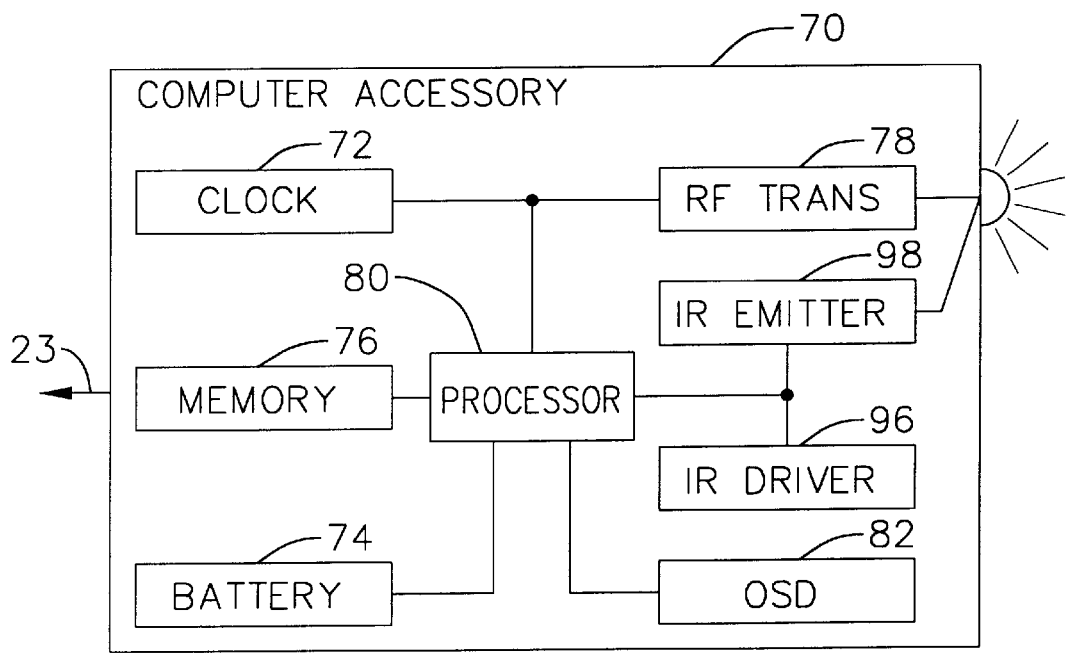
FIG. 3 illustrates a computer accessory for the computer system.

FIG. 3 illustrates a computer accessory for the computer system. Computer accessory 70 is any external hardware capable of controlling television 30, VCR 34 and/or VCR 36. In the preferred embodiment, computer accessory 70 is connected to computer 12 through available serial, parallel or other port 23. Clock 72, located within computer accessary 70 in the preferred embodiment, maintains current time. Battery 74 provides a continuous supply of power when the computer accessory's regular available power is not present. Memory 76 contains the key parameters needed for recording and/or tuning to a selected television program. These parameters include the date of the program, the start time for the program, the end time for the program, the television channel providing the program, and which peripheral device shall be addressed for recording or viewing the program.

Processor 80, also located within computer accessory 70, uses the software in the computer system to provide memory 76 with these key parameters. Memory 76 is a random access memory (RAM) and RF transmitter 78 is, for example, similar to a transmitter provided in a portable telephone or RF wireless headphones. RF transmitter 78 may be substituted with, for example, IR emitters, modulated light signals (i.e., signal sent through optical fibre), or even a hardwire connection. In the preferred embodiment, RF transmitter 78 is used in conjunction with a remotely located VCR connector 90 to communicate parameters needed for automatic tuning and/or automatic recording to television system 30. Processor 80 uses clock 72 and memory 76 to provide the information needed for transmission by RF transmitter 78.

Figure 4:
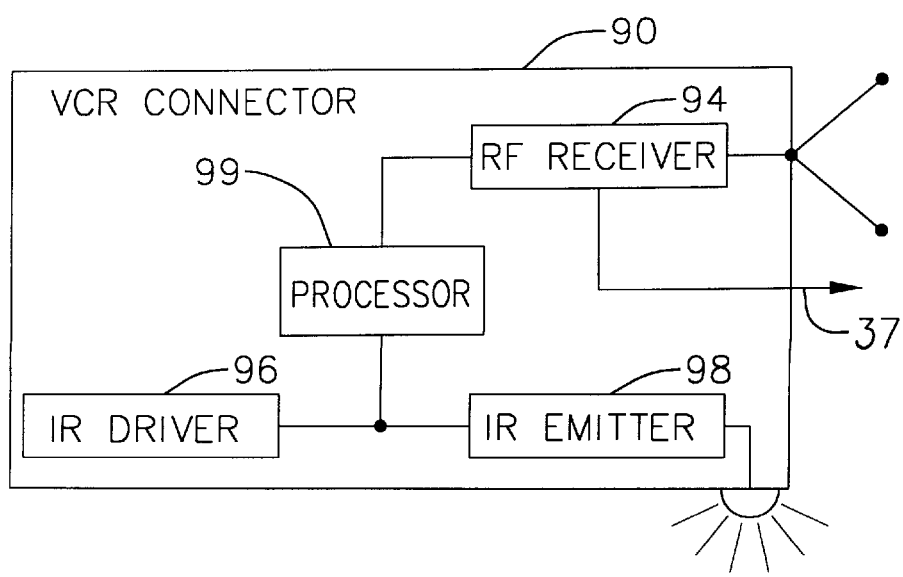
FIG. 4 illustrates a recording device connector for the television system.

FIG. 4 illustrates a recording device connector for the television system. In the preferred embodiment, recording device (e.g., VCR) connector 90 is coupled to VCR 34 in television system 30, via line 37. This connector 90 can also be a television connector which is connected to television 32. VCR connector 90 contains RF receiver 94 which receives the information transmitted from RF transmitter 78. Infrared (IR) driver 96 then works in conjunction with IR driver 96 and IR emitter 98 to provide any necessary signals to other peripheral devices within television system 30. Processor 99 assists with this process.

For example, if a user decides to tune the television to a certain program which is presently available or to schedule the television to be tuned to a certain program at a future time, the user moves the cursor with user input device 60 to the desired show within computer screen 50 and enters it ("enter" key with a keyboard or "clicking" with a mouse). The information is provided to computer accessory 70 via line 23 and then automatically transmitted via RF transmitter 78 to RF receiver 94. IR driver 96 and IR emitter 98 then take the information from RF receiver 94 and immediately tune the television 32 to the channel providing the selected television program. More than one IR driver 96 may be used for the present invention. For example, one IR driver may be used for television 32, and another IR driver may be used for VCR 34. In addition, computer accessory 70 and VCR connector 90 (or the alternative devices which provide their functions as described below) can be located in different rooms within a private residence or a commercial building.

If the user has selected a program from the computer for recording on VCR 34, at the selected program's start time, the information for activating and recording on the VCR is automatically sent from RF receiver 94, through VCR connector 90, to VCR 34 via line 37. Thus, in the preferred embodiment, at the start time of the selected program, (1) the VCR is turned "on", (2) the tuner (or an external device) is tuned to the channel carrying the selected program, and (3) the record function of the VCR is activated. Later, when the program end time occurs, the record function of the VCR is turned "off," and the VCR is turned "off." In this arrangement, IR driver 96 and IR emitter 98 are not used.

In the preferred embodiment, when IR driver 96 and IR emitter 98 are used, they act in the same way that a remote control would act to control the other peripheral devices (e.g., television 32, VCR 36, and the like) within television system 30. For example, if two programs occurring at the same time are selected for automatic recording, IR driver 96 and IR emitter 98 are used to (1) tune the tuner on a second VCR to the channel carrying the selected program, etc. For additional information of how an IR emitter can be used to act as a remote control, see U.S. Pat. No. 5,151,789 to Young, which is hereby incorporated by reference in its entirety for all purposes.

In another embodiment of the present invention, VCR connector 90 is connected in series between VCR 34 and television 32 via line 38. In this arrangement, IR driver 96 and IR emitter 98 are not needed because information received by RF receiver 94 can be sent to either VCR 34 or television 32 via line 38. For example, line 38 is used to transmit the data for automatic tuning. When a user selects a television program for immediate viewing, a tuning command for changing the television tuner to the channel carrying the desired program is sent from RF transmitter 78 to RF receiver 94. Processor 80 then sends this tuning command from RF receiver 94 to television 32 via line 38.

In yet another embodiment of the present invention, IR driver 96 and IR emitter 98 are located in computer accessory 70 (see FIG. 3). When this configuration is present, VCR connector 90 is not needed. For example, when a desired television program is selected for automatic tuning, IR driver 96 and IR emitter 98 work in conjunction to tune television 32 to the channel carrying the desired program. Similarly, when a desired television program is selected for automatic recording, IR driver 96 and IR emitter 98, at the desired program start time, (1) tune the VCR to the channel carrying the desired program, etc. This arrangement can also be used when multiple desired television programs, airing at the same time, are selected for automatic recording. This is done in the same manner as described above. Also, if desired, the data providing the television schedule information to computer 12 can be organized into a desired format and then transmitted via computer accessory 70 to television 32 for immediate display on television 32. For automatic display on television 32 in this arrangement, computer accessory 70 must contain on-screen display generator (OSD) 82.

In yet another embodiment of the present invention, computer accessory 70 is located inside computer 12 (see RF transmitter 78 location in computer 12, FIG. 1) and/or VCR connector 90 is located inside, for example, VCR 34 or television 32. The location of computer accessory 70 and VCR connector 90 is not critical because the IR emitter allows for remote control of all of the peripheral devices.

In yet another embodiment of the present invention, the components of both computer accessory 70 and VCR connector 90 are located inside computer 12. Therefore, RF transmitter 78 and RF receiver 94 are not required. Computer 12 most likely has an internal battery and clock provided, so battery 74 and clock 74 may not be needed. Memory 76 can be provided by hard drive 14. Processor 80 may not be needed because processor 16 can perform its functions. In this embodiment, IR driver 96 and IR emitter 98 provide the tuning and recording parameters to television 32 and VCRs 34 and 36 (see FIG. 1 for placement of IR driver 96 and IR emitter 98 within computer 12). Similarly, if computer 12 contains television/video board 19 in this arrangement, a selected television program can be viewed on computer screen 50. Additionally, a selected television program can be stored within computer 12 in a memory or mass storage device (e.g., hard drive 14, disk or tape). Thus, no need would exist for the transmission of parameters needed for automatic tuning and automatic, unattended recording, and the associated IR devices 96 and 98 would not be present. Finally computer 12, television 30, VCR 37 and all additional electronic devices could be on a home network. In this arrangement, no transmitters or internal receivers would be necessary.

Figure 5A:
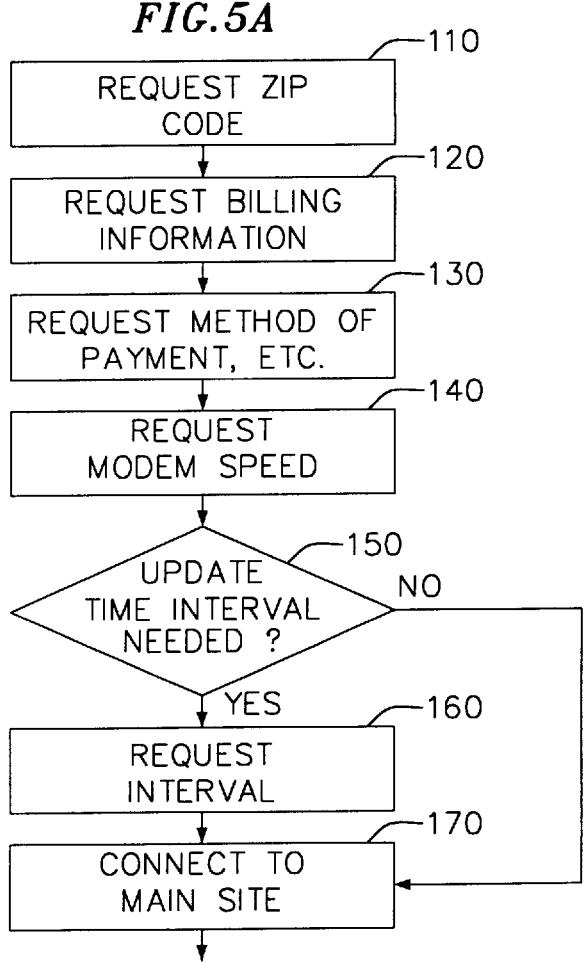
FIG. 5 illustrates a process flow chart for the installation procedure.
Figure 5B:
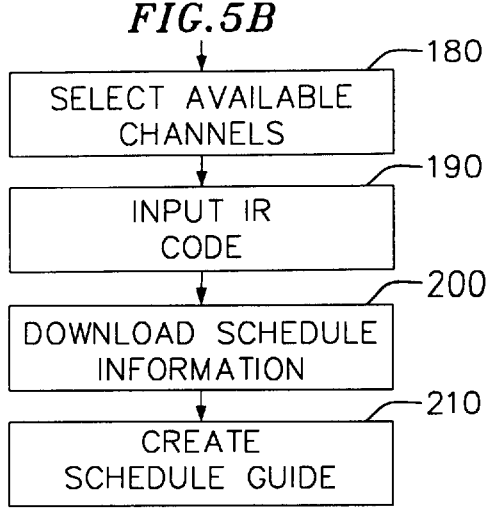

FIG. 5 illustrates a process flow chart for the installation procedure. This process flowchart reveals the sequence used for installing the computer program needed for receiving, organizing, and displaying the television schedule information grid guide. This installation process flow allows for an account setup and for the downloading of schedule information. The data needed for the television schedule guide are downloaded to hard drive 14 in the preferred embodiment. As stated above, diskettes providing the computer program are placed in disk input 18 and installed on hard drive 14. The user is then asked to input various information. The system first requests the user's zip code at step 110. Billing information is requested at step 120, and method of payment along with associated information for payment is requested at step 130. In an alternative embodiment, billing information (e.g., credit care information or the like) may be input each time a user connects to an on-line service. Additionally, an automatic confirm may take place at step 120. For example, a user may already have an identification number from previous system use. Confirmation of this identification number would allow the system to access stored user profile information which contains the user's billing data.

In the preferred embodiment, modem speed for the communication setup is requested at step 140 (this step is optional). The computer program, in conjunction with processor 16, checks to see if the update time interval is needed at step 150. The update time interval determines how often the television schedule guide information is updated for the user. For example, updates could take place each time computer 12 is booted-up, once a day, or 4 times a week. If the update time interval is needed, a request is sent to the user at step 160. If the time interval is not needed, a connection to the main site is made at step 170. The main site provides the data needed for the television schedule guide and receives information, such as a credit card number for billing purposes, via line 22. The user can then select which available channels will be displayed on computer screen 50 at step 180. Thus, the user can customize the displayed information at step 180. The user is then asked to input or select IR codes at step 190. These IR codes are used for communicating with peripheral devices within television system 30. In the preferred embodiment, these IR codes are sent to memory 76 within computer accessory 70. The data needed for the television schedule are then downloaded via line 22 at step 200. Processor 16 and the computer program installed on hard drive 14 work in conjunction to create the schedule guide for display on computer screen 50 at step 210.

Figure 6:
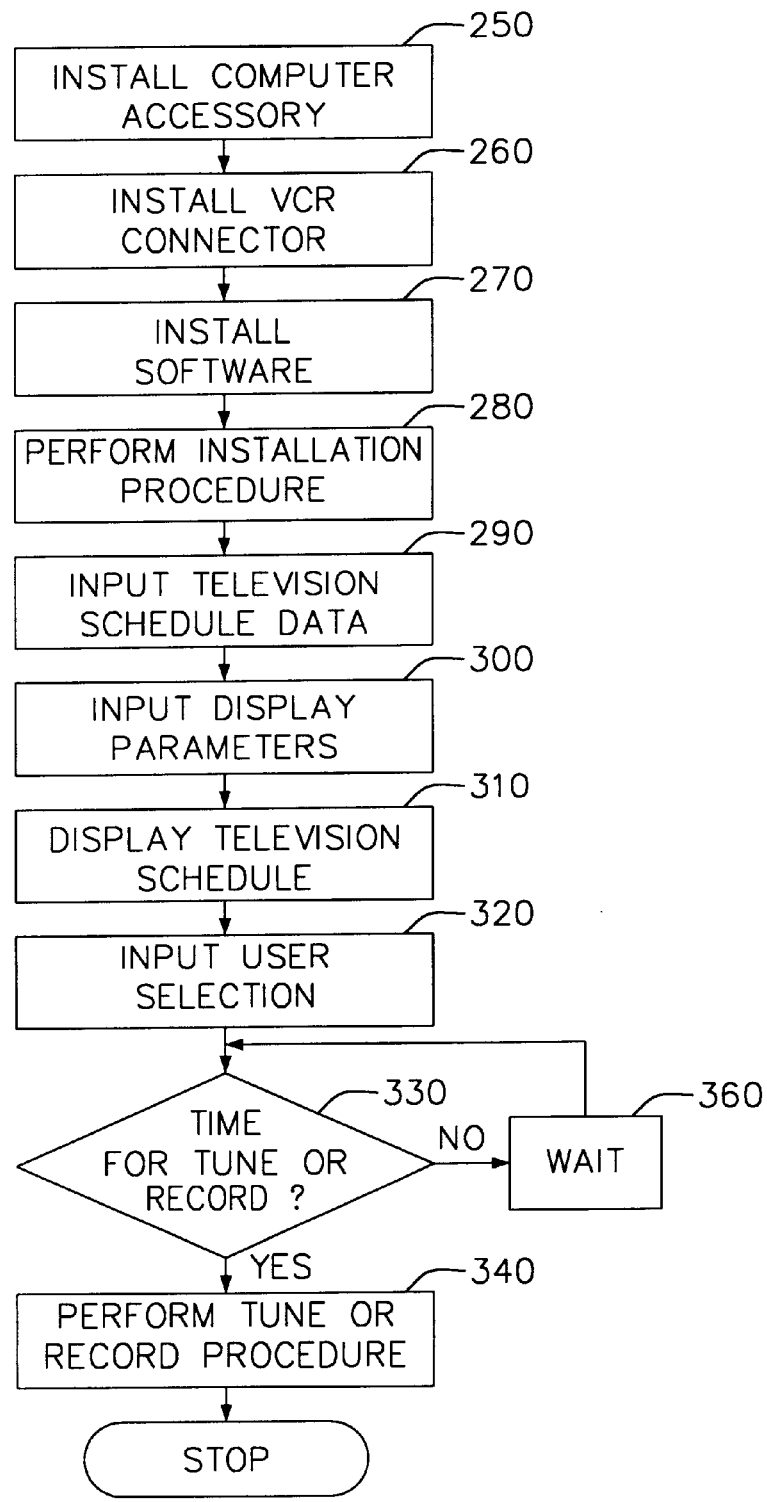
FIG. 6 illustrates a process flow chart for the operation of the schedule/control system herein.

FIG. 6 illustrates a process flow chart for the operation of the schedule/control system herein. At step 250, the user installs computer accessory 70 by coupling it to computer 12 via available serial or parallel port 23. At step 260, the user installs VCR connector 90 by connecting it to VCR 34 via line 37. At step 270, disk input 18 is used to provide hard drive 14 with the software needed for receiving, organizing and displaying data which provides the system's television schedule guide. This software also supplies the automatic tuning and automatic, unattended recording of the present invention. Thus, this software is taken from diskettes and stored/installed on hard drive 14. At step 280, the user or service person performs the installation/set-up procedure set forth in FIG. 5. At step 290, the data needed for updating the schedule information are received via telephone line 22.

At step 300, the user can input any additional desired display parameters for the display of the television schedule guide. For example, the user can have certain channels eliminated from the displayed television schedule guide, or the user can select a particular order for each of the television channels within the guide. At step 310, the television schedule guide is displayed, upon user request, on computer screen 50 as shown in FIG. 2. At step 320, the user can enter a selection from the television schedule guide via user input device 60. The user can select a program for either automatic tuning or for automatic, unattended recording. At step 330, the software determines if the time for the automatic tune or record is equal to the present time. If the program start time is not equal to the present time, then the software waits at step 360. If the time equals the present time, then the software performs automatic tuning or automatic recording at step 340. Automatic tuning and automatic recording is set forth in U.S. patent application Ser. No. 08/423,411, as stated above. The process flow chart of FIG. 6 is then complete.

In another embodiment of the present invention, a computer program located, for example, on hard drive 14 can monitor and track user selections. This computer program can then be used to provide suggested television programs to the user. Additionally, if desired, the computer program can automatically schedule suggested television programs for automatic tuning and/or automatic, unattended recording.

Figure 7:
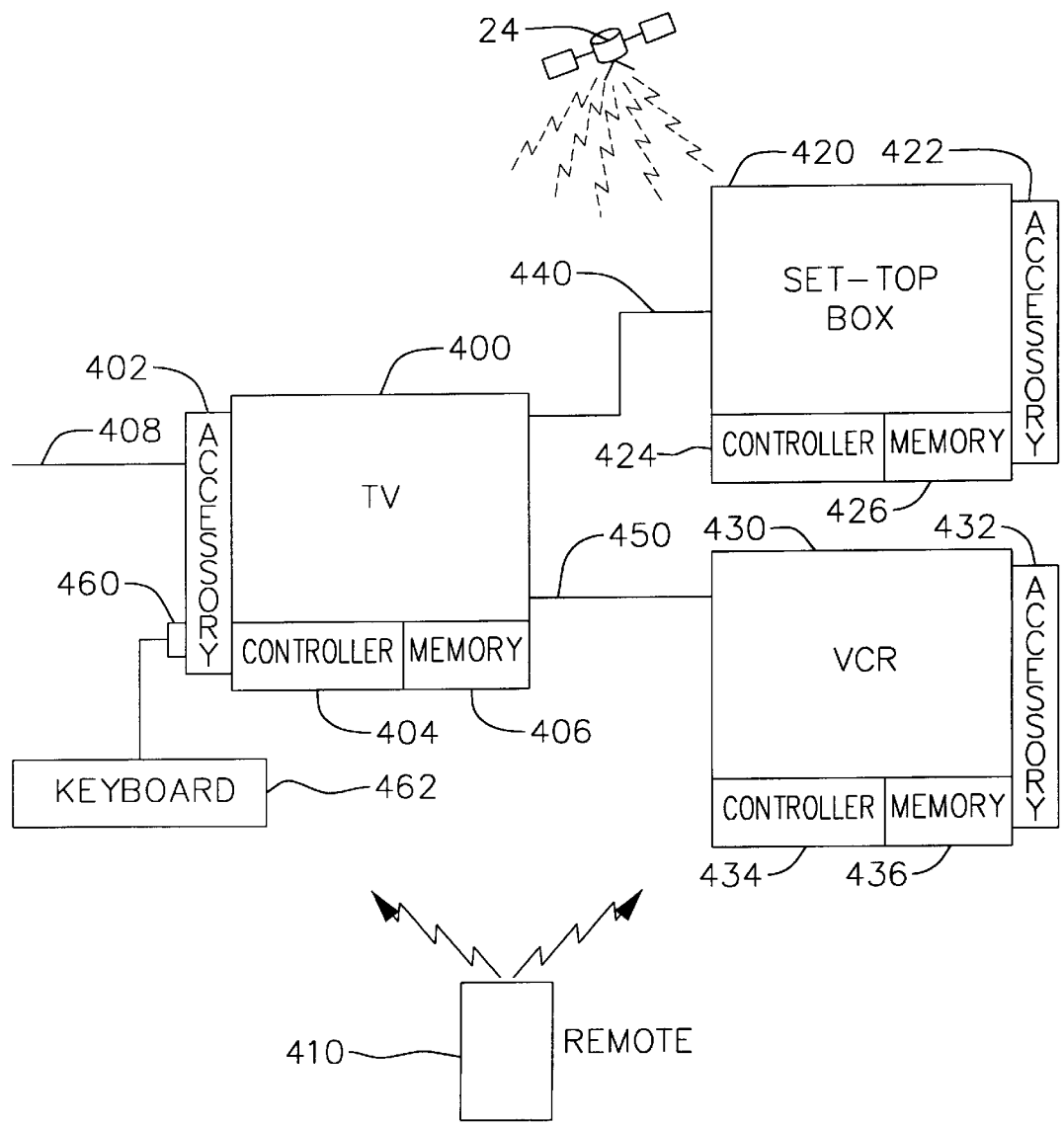
FIG. 7 illustrates several arrangements for providing television schedule information from a database to a television for display.

FIG. 7 illustrates several arrangements for providing television schedule information from a database to a television for display. In one embodiment, on-line information providers (Prodigy, America On Line, Compuserve, MSN, AT&T, etc.) provide access to a database which contains the television schedule information. These on-line information providers can transmit data to television 400. In the preferred embodiment, a modem within accessory 402 is utilized to provide the data. Accessory 402 is attached to television 400 and directly connected to telephone line 408 via the modem. The modem for access to the on-line service can also be located within television 400. Software, located either within accessory 402 or television 400, is used to search for and provide the data, along with providing several other features described below.

The available data, displayed on television 400, can emulate what a computer on-line user normally sees when accessing the internet through a personal computer. This television schedule data can also be further enhanced to "tie into" the television program that the user is viewing. Alternatively, accessory 402 may be replaced by accessory 422 which is attached to set-top box 420 (e.g., a cable box). The data provided via the on-line information provider is then transmitted to television 400 over line 440. Similarly, accessory 432, attached to VCR 430, can be used to obtain the television schedule data. The data would then be transmitted from VCR 430 to television 400 over line 450.

In another embodiment, the database with the television schedule information is located in memory 406 within television 400. Controller 404 is used to obtain the data from memory 406 so that is can be displayed on television 400. Alternatively, the database with the television schedule information could be located in memory 426 (within set-top box 420) or in memory 436 (within VCR 430). Controller 424 or controller 434 would be used to obtain the data which would then be sent to television 400 for display via line 440 or line 450. Therefore, the technology that enables the television schedule information to be provided from a database to a television for display is not specific to any given data system. In summary, this technology can be resident in the user's set-top box 420, television 400, VCR 430, personal computer or the like.

The television schedule information provided from a database can be used to provide information which is independent of the user's program choice. For example, from a television schedule guide, the user can utilize remote control 410 to press a Services button. This Services button can be located on remote control 410 or within the television schedule guide display. When the Services button is pressed, the user is given choices such as News, Weather, Sports, Scores, Financial Data, Local Traffic, etc. Using remote control 410, the user can then select the area or title of interest, and the associated information from the database is provided. If accessory 402 is used, a modem accesses the on-line service which provides the information from the database. Once this connection is made, the user has two-way communication with the on-line service provider. The user can then go deeper into the given selections or, if requested and keyboard 462 is available, can access the Internet and enter chat rooms or other interactive services. In the preferred embodiment, keyboard 462 is either an IR keyboard or connected to port 460 on accessory 402.

In yet another embodiment, a television program title and/or a program's content could be linked to an on-line service or to an available database. In this arrangement, a user, in conjunction with the data made available through an electronic program guide (or navigational system), can link, search and select more information relating to specific areas of interest or concerns associated with a program or a program's title. In the preferred embodiment, a user of an electronic program guide (e.g., as described above) can conduct a search for information about a particular program/television show or for information relating to the show, the actors, the actresses, the show's theme, and other related information through selection via a user interface. This linking of program title and/or program content to additional related information could be operable whenever a program title is accessible in a electronic program guide. Additionally, this linking could be available whenever a user requests it via the currently tuned program.

For example, a user previewing the program such as a movie (e.g., "Casablanca") can receive information regarding (1) the actors and actresses in that movie, (2) other movies released during the same time period, (3) associated available products, (4) related travel packages, and (5) advertisements and promotions available through primary, secondary or third party vendors. Utilizing a user interface such as remote control 410 or keyboard 462, the user can indicate to the electronic program guide what information they would like to view on television 400. The electronic program guide then lists a selection of choices for the user. In the preferred embodiment, the choices are associated with the context of the selected program and can be changed via the electronic program guide supplier. In a specific "Casablanca" example, the choices might be (1) Other Humphrey Bogart Movies, (2) Other Lauren Bacall Movies, (3) Other Movies Released in the Same Era, or (4) Associated Products. The user selects from the presented choices, and the electronic program guide contacts and communicates with the database of available information for more detailed information relating to the user's choice. Once contact and communication is established between the user and the database of available television information, the electronic program guide acts as an agent to assure that the information flow and appropriate data is exchanged. At this point, the user can delve deeper into the available information by selecting from a series of further choices or related topics. For example, if the user chooses (1) Other Humphrey Bogart Movies option, the electronic program guide contacts and communicates with the selected database of available information. The database of available information is then used to collect the requested data of other Humphrey Bogart movies. The selected choice is transmitted and used by the electronic program guide as it's contextual reference for the search. A list with the search results is then displayed on television 400.

Once the user sees the list of other Humphrey Bogart movies, the user can select any of the available titles for recording or watching. In the preferred embodiment, each time the available database is contacted and searched, previously selected movies can be identified. In addition, a user can select certain types of programs to be recorded or watched before any particular program is available to the electronic program guide. Moreover, each time a connection is made to an on-line service, the software can search the database and set the selected types of programs to be recorded. These features enable a consumer to never miss a favorite program.

In another example, a user is viewing a sporting event. If the Services button is pressed, a different menu appears including the following choices: (1) Sports Scores, (2) Current Game Statistics, (3) Current Player Statistics, and (4) Associated Products. If the user selects (4) Associated Products, the software, for example, accesses the modem within accessory 402 and dials an on-line service provider. The on-line service provider then lists a series of selections associated with the game (e.g., 49er's hats, Giant's Baseball Bats from Louisville Slugger, Nike Spiked Football shoes for Pop Warner, etc.).

In yet another embodiment of the invention, the system is able to aid the user in identifying programs of potential interest. This embodiment of the invention is compatible with the system regardless of whether the electronic guide is located within a computer database, a stand-alone peripheral device (e.g., set-top box), a television, a VCR, or elsewhere. Furthermore, manipulation of the program guide information can be performed utilizing the electronic program guide's internal controller/data processor or using an external data processor (for example, a computer) coupled to the electronic program guide.

Figure 8:
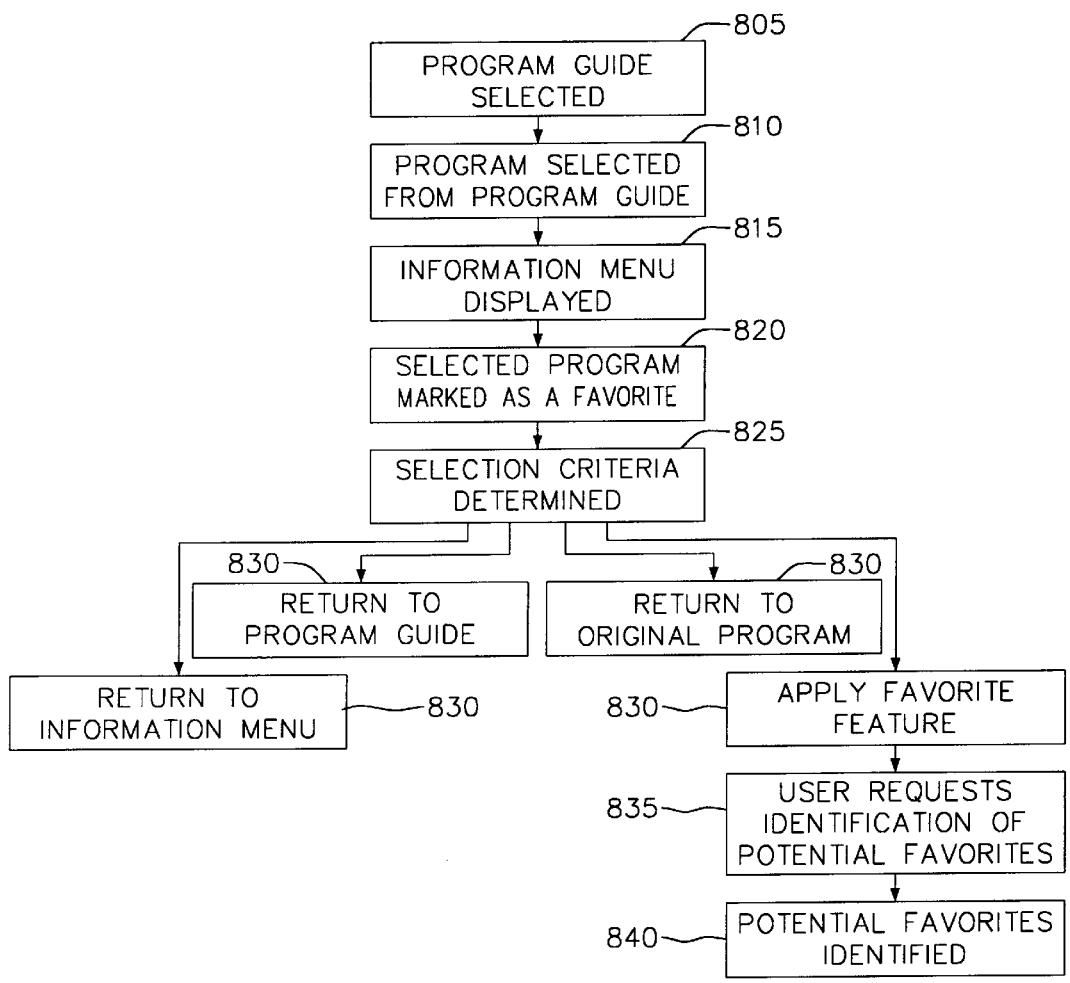
FIG. 8 illustrates the preferred procedure for utilizing the FAVORITE characteristics aspect of the invention.

FIG. 8 illustrates the preferred procedure for utilizing this embodiment of the invention. At step 805, the user selects the program guide feature. This selection can either be accomplished using a remote controller or a switch located on a component of the television system (i.e., television, VCR, set-top box, computer, etc.). At step 810, the user selects a particular program from the program guide. Selection of the particular program in step 810 results in an information menu appearing on the user's television or computer screen (step 815). At step 820, the user requests that the selected program be marked as a FAVORITE. At step 825 the system, through a series of questions, determines the criteria the user had applied in selecting the program as a FAVORITE. At step 830, and after completing the series of questions posed in step 825, the user can return to the information menu, return to the program guide, go back to the program being viewed prior to entering the system's program guide mode, or continue using the FAVORITE feature of the system.

At step 835, the user requests that the system identify potential favorites based on the previously entered favorite selection criteria. The system can either be configured to continually check all new program listings for potential favorites or check for favorites only when requested to do so by the user. In an alternate embodiment of the invention, the system automatically determines and identifies potential favorites after the user has entered a set of favorite selection criteria.

Potential favorite programs can be identified in a number of different ways (step 840). First, within the program guide potential favorites can be identified with a mark near the title (for example, an asterisk), using a different typeface for the title, or by color coding the grid block containing the title of the potential favorite. Second, potential favorites can be displayed in a list separate from the program guide, this list preferably being displayed only when requested by the user.

Figure 9:
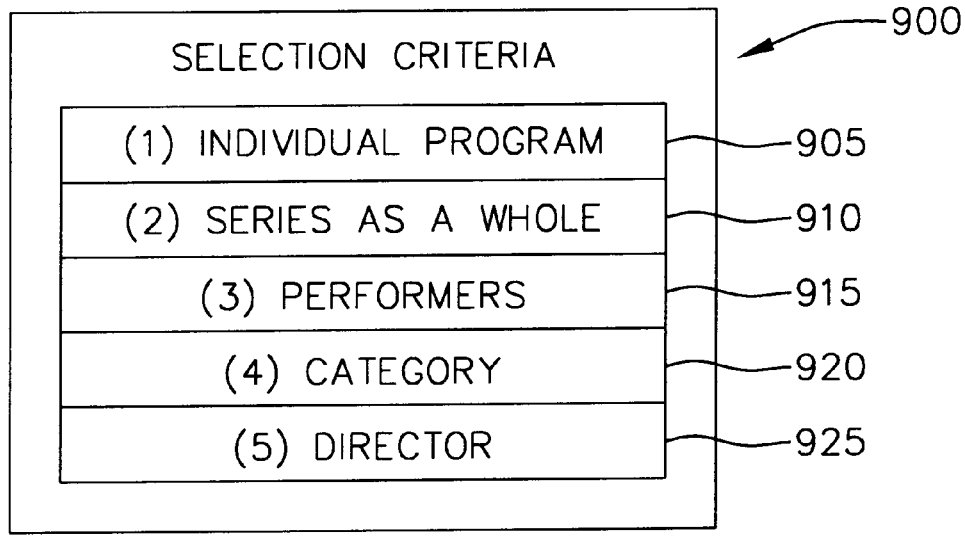
FIG. 9 is an illustration of a menu according to one embodiment of the invention.

FIG. 9 is an illustration of an initial menu 900 in the preferred embodiment of the invention, this menu being displayed once the user identifies a program as being a FAVORITE. Menu 900 lists a series of criteria that the user may have used in identifying the program as a favorite. The user is able to select either single items or multiple items from menu 900. Criterion 905 lists INDIVIDUAL PROGRAM. This selection is typically identified by the user as a default when the user has selected a particular program for no apparent reason. For example, the user may have noticed that a particular movie had extremely good reviews and therefore wanted to see the movie. When this selection is made, the system may provide additional questions, for example, GOOD REVIEWS, RECOMMENDATION OF A FRIEND, BY CHANCE, or the system may simply record the entry as further data regarding this particular user's interests.

Criterion 910 lists SERIES AS A WHOLE. Typically if the user selects this entry the system will identify all future programs from this same series as FAVORITES.

Criterion 915 lists PERFORMERS. When the user selects PERFORMERS, the system may present additional menus which then allow the user to identify which performers in the program are of particular interest. For example, if the user had identified "Legends of the Fall" as a FAVORITE, and then selected PERFORMERS from menu 900, the system may provide an additional menu which lists ANTHONY HOPKINS, BRAD PITT, JULIA ORMOND, and OTHER as the possible selections. Once the user has identified a specific performer as the reason why a particular program was identified as a FAVORITE, the system can then find and identify other programs containing the same performers. For instance, if in the above example the user had identified Anthony Hopkins as the particular performer of interest, the system might identify another movie containing the same performer, such as "Silence of the Lambs," or might identify another program on which Anthony Hopkins was a guest, such as "The Tonight Show."

Criterion 920 lists CATEGORY. If the user selects CATEGORY, the system may present additional menus listing a number of different categories. For example, the subsequent menu may list COMEDY, DRAMA, ACTION, SUSPENSE, TALK SHOW, HORROR, MUSICAL, CHILDRENS, ADULT, CLASSIC, LOCATION, CINEMATOGRAPHY, etc. Subsequent menus may also be available to further refine the selection criterion applied by the user. For example, COMEDY may have a subsequent menu listing SERIES, MOVIE, STARRING A STAND-UP COMEDIAN, SLAP-STICK, etc. Based on this input, the system can then identify additional programs of potential interest to the user.

Criterion 925 lists DIRECTOR. If the user selects DIRECTOR, preferably the system records the director of the present FAVORITE as a FAVORITE DIRECTOR and attempts to identify other programs directed by the same director.

In another embodiment of the invention, the system keeps an on-going data list for one or more users. In this embodiment each user of the system identifies themselves to the system either before or after requesting that a particular program be marked as a FAVORITE. User identifications may be by name, by code word, or by user number. After identifying the user, the system inputs the particular user's favorite selection criteria under that user's data file. Thus User 1 may have all cooking programs and all NFL games as their selection criteria while User 2 may have all programs in which either Jerry Seinfeld or Anthony Hopkins perform. Furthermore, the user has the ability to continually modify their selection criteria. For instance, in the above example User 2 may delete Anthony Hopkins as a FAVORITE PERFORMER 2 weeks after making this addition, and then 3 weeks later add Ed Wood as a FAVORITE DIRECTOR.

In yet another embodiment of the invention, the system can be configured to utilize a user's set of preferences in other ways than those previously disclosed. For example, besides using the information to identify and mark programs of potential interest to the user, the system can be configured to remind the user when a program of potential interest is about to air. The system can also be configured to automatically record programs of potential interest. The system can also be configured to automatically record programs of potential interest unless it is determined that the user is presently viewing the program of interest (i.e., the television system is presently tuned to the program of potential interest).

Figure 10:
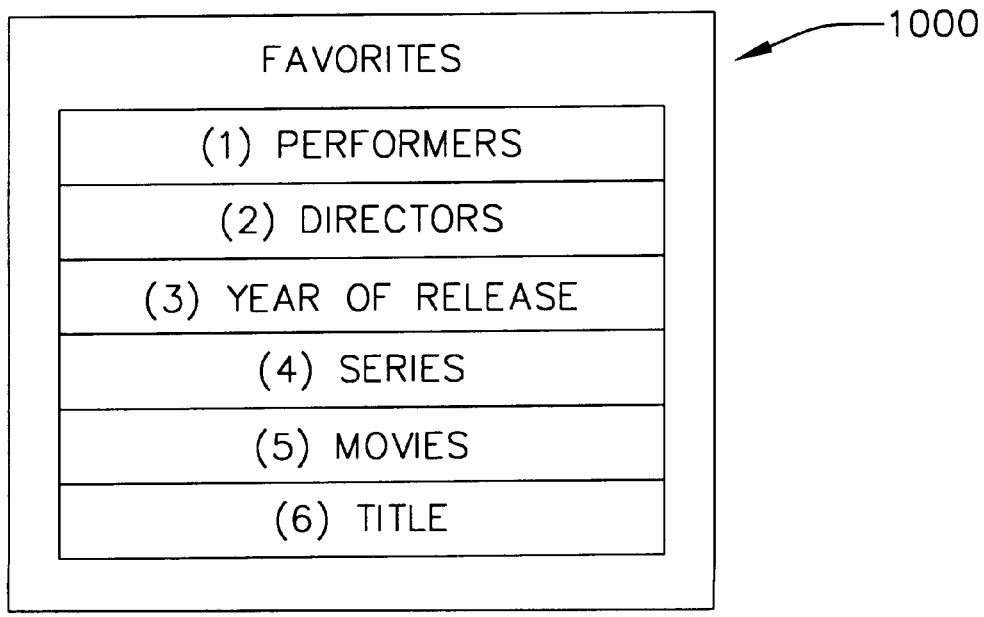
FIG. 10 is an illustration of a sub-menu which is displayed when the user selects FAVORITES from the main menu in one embodiment of the invention.

In yet another embodiment of the system, instead of the user initially identifying a particular program as a FAVORITE, the user simply enters selected preferences and requests that the system search the available program guide for potential programs of interest. Preferably, within the THEMES AND SEARCHES menu there is a subcategory entitled FAVORITES. When the user selects the FAVORITES category, a sub-menu 1000 is displayed as illustrated in FIG. 10. Sub-menu 1000 lists several different categories from which the user can select. For example, sub-menu 1000 may list such categories as PERFORMERS, DIRECTORS, YEAR OF RELEASE, SERIES, MOVIES, TITLE, etc. In this embodiment, the system is provided with a means for the user to input alpha-numeric characters. Thus if the user enters "Seinfeld" under the category PERFORMERS, and indicates that the program of interest is a SERIES, the system would identify the "Jerry Seinfeld" program as being of potential interest. Therefore if the user has any information regarding a particular program or a type of program which is of interest, this embodiment of the invention allows the user to search the existing program guide for that particular program.

Figure 11:
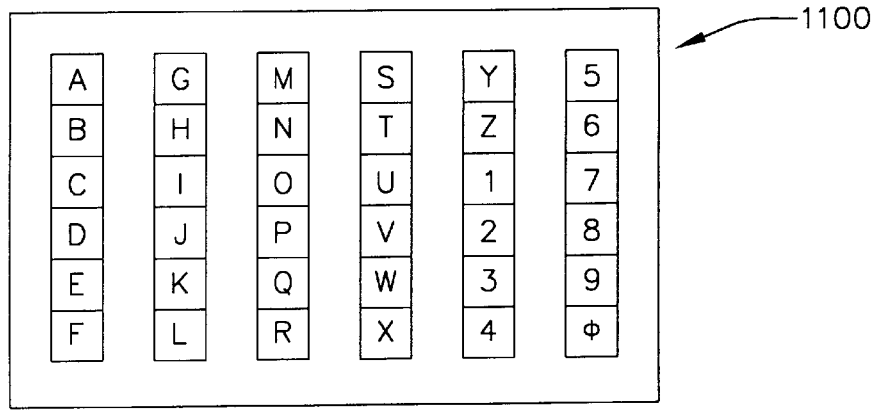
FIG. 11 is an illustration of an alpha-numeric character set displayed on a screen which allows a user to input specific names or dates into the system.

The means for inputting characters and numbers into the system can be a simple remote controller with an alpha-numeric keypad. The system can also be designed to display alpha-numeric characters on the television or computer screen and means for the user to select specific characters. For example, after the user selects PERFORMERS, a menu 1100 as illustrated in FIG. 11 can be displayed. In one embodiment of this system, the user moves a cursor displayed on the screen using a set of arrow keys on the remote controller. Once the cursor is moved to the desired location on the screen, the user presses an ENTER key on the remote controller. This process continues until the desired name or date has been entered into the system. In an alternate embodiment, the system further includes a database which includes such information as performers, directors, and movie titles. In this embodiment, after the user has entered a predetermined number of characters (for example, three) the system provides the user with a list of all the information within the database meeting the given criteria. For example, if the user selected MOVIES and entered "DR." the system might provide a list which includes "Dr. Doolittle," "Dr. Zhivago," "Dr. Jekyll and Mr. Hyde," and "Dr. Strangelove." If the user then selected "Dr. Strangelove" the system would search the program guide to see if the desired movie was to be presented in the near future. The system can also be configured to continually search the program guide as it is updated, notifying the user when the desired program has been located.

Figure 12:
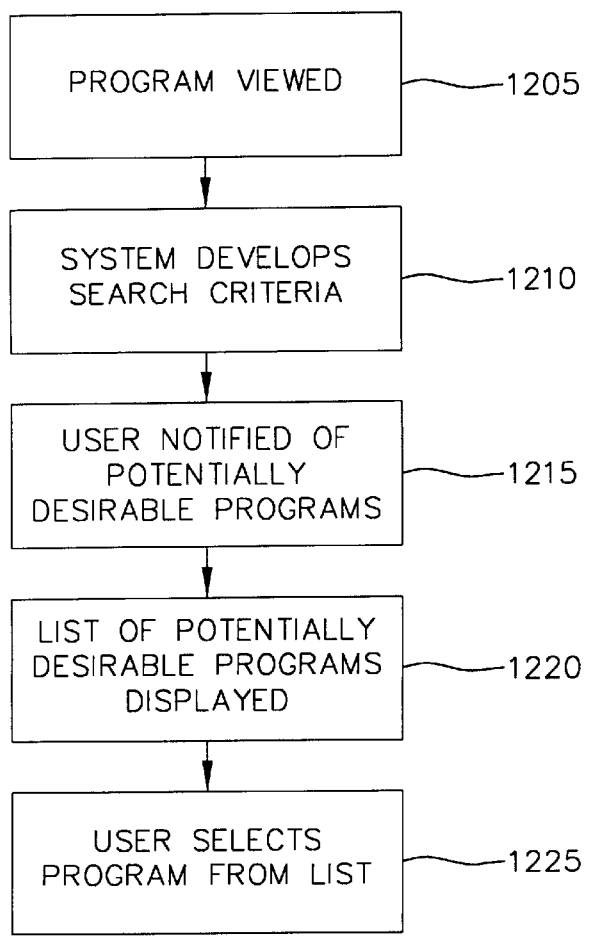
FIG. 12 illustrates the procedure utilized in an alternate embodiment of the invention.

In yet another embodiment of the invention illustrated in FIG. 12, the system actively searches for programs of potential interest whenever the user views a program. In order to rule out programs which the user is only casually viewing, preferably the system does not attempt to locate programs of potential interest until the user has watched a particular program for at least a predetermined period of time, for example, 10 minutes. (Step 1205). After the user has continually watched a particular program for the predetermined period of time, the system develops a series of criteria to use to search the program guide for other programs fitting the same criteria and therefore of potential interest to the user. (Step 1210) For example, if the user watches the "Jerry Seinfeld" program, the system may use any or all of the following as search criteria: ½ hour comedy programs, comedies, programs starring a stand-up comedian, programs in which Jerry Seinfeld is a performer. If any programs fitting the perceived criteria are found, the system notifies the user. (Step 1215) For example, the system may flash OTHER PROGRAMS on the bottom of the screen. In a different configuration, the system may require the user to select OTHER PROGRAMS from an information menu. If the user asks for additional information about the OTHER PROGRAMS, the system supplies the user with a list. (Step 1220) The user can then select one or more of the programs from the OTHER PROGRAMS list to (i) view immediately, (ii) be reminded of prior to broadcast, or (iii) record. (Step 1225).

As will be understood by those familiar with the art, the present invention may be embodied in other specific forms without departing from the spirit or essential characteristics thereof. Accordingly, disclosure of the preferred embodiment of the invention is intended to be illustrative, but not limiting, of the scope of the invention which is set forth in the following claims.

What is claimed is:

1. A method of determining potentially desirable programs in a television system, said method comprising the steps of:

selecting a specific program listing from a electronic program guide, said program guide containing a plurality of program listings, wherein said program guide is displayed to a user;

designating said specific program listing as a favorite program to set the specific program listing to be a first selection criterion;

identifying at least one selection criterion used in selecting said specific program from said program guide to determine a second selection criterion in response to setting the first selection criterion; and applying the determined second selection criterion to said plurality of program listings within said program guide to determine potentially desirable programs.

2. The method of claim 1, wherein said selection criterion is selected from the group consisting of performer, director, film location, series, individual program, category, and cinematography.

3. The method of claim 2, further comprising the step of identifying at least one specific performer associated with said favorite program.

4. The method of claim 2, further comprising the step of identifying at least one specific director associated with said favorite program.

5. The method of claim 2, further comprising the step of identifying a specific category associated with said favorite program, wherein said specific category is selected from the group consisting of comedy, drama, suspense, talk-show, horror, musical, action, childrens, adult, and classic.

6. The method of claim 1, further comprising the step of marking the program listing corresponding to said potentially desirable programs.

7. The method of claim 6, wherein said step of marking is performed using a technique selected from the group consisting of placing a notation next to said program listing, using a distinguishable typeface for said program listing, placing an outline around said program listing, and using a distinguishable color for said program listing.

8. The method of claim 1, wherein said applying step is automatically repeated each time said program guide is updated.

9. The method of claim 1, further comprising the step of compiling and storing said identified selection criterion in a database each time one of said program listings from said program guide is selected and designated as a favorite program.

10. The method of claim 9, wherein said compiled and stored selection criterion is modifiable by adding or deleting additional selection criterion.

11. The method of claim 9, further comprising the step of correlating said compiled and stored selection criterion with a specific user, said user selected from a plurality of users.

12. The method of claim 1, further comprising the step of notifying a user of said television system prior to a start time of said determined potentially desirable program.

13. The method of claim 1, further comprising the step of recording said determined potentially desirable program on a VCR, said VCR coupled to said television system.

14. The method of claim 1, further comprising the step of compiling a list of said potentially desirable programs.

15. A method of identifying potentially desirable programs in a television system, said method comprising the steps of:

selecting a specific program listing from an electronic program guide, said program guide containing a plurality of program listings, wherein said program guide is displayed on a screen coupled to said television system, and wherein each listing of said program guide is characterized by an independent set of program features;

designating said specific program listing as a favorite program to set said specific program listing to be a first selection criterion;

identifying a specific set of program features associated with said favorite program to determine a second selection criterion in response to setting the first selection criterion;

comparing each set of program features associated with each program listing in said program guide to the determined second selection criterion; and identifying each program listing as representing one of said potentially desirable programs in which a set of program features corresponding to a program listing of the plurality of program listings is equivalent to the determined second selection criterion.

16. The method of claim 15, wherein equivalent is defined as having at least one program feature of said set of program features in common with at least one program feature of said specific set of program features.

17. A method of searching an electronic program guide coupled to a television system, wherein said program guide contains a plurality of program listings, and wherein each program listing of said program guide is characterized by an independent set of program features, said method comprising the steps of:

setting a program listing from the plurality of program listings to be a first selection criterion;

determining a second selection criterion based on and in response to the first selection criterion being set;

entering at least one desired program feature from the second selection criterion including the group consisting of performer, director, producer, title, film location, and year of release;

comparing each program feature associated with each program listing in said program guide to the at least one desired program feature; and identifying each program listing as a potentially desirable program in which at least one program feature associated with each program listing is equivalent to the at least one desired program feature.

18. The method of claim 17, further comprising the step of marking said identified program listing corresponding to said potentially desirable program.

19. The method of claim 17, wherein said entering step is performed using an alpha-numeric keypad.

20. The method of claim 17, wherein a specific name is associated with each of said desired features, and wherein said specific name is entered with an alpha-numeric keypad, said method further comprising the steps of:

comparing a portion of said entered specific name to a database coupled to said data processor, said database containing a plurality of names associated with said program features characterizing said plurality of program listings; and displaying each of said program listings in which at least a portion of one of said names associated with said program features which characterize said displayed program listing is equivalent to said portion of said entered specific name.

21. A television system comprising:

a data processor coupled to said television system;

a database coupled to said data processor, said database containing a program guide, said program guide containing a plurality of program listings;

a screen coupled to said television system capable of display said program guide;

a user input device coupled to said data processor for setting a specific program listing to be a favorite program as a first selection criterion;

wherein said data processor is configured to generate a displayable list of selection criteria in response to the specific program listing being set to be the favorite program and to allow at least one specific selection criterion to be identified and determined to be a second selection criterion based on the setting of the favorite program as the first selection criterion; and wherein said data processor is configured to compare the at least one specific selection criteria to said plurality of program listings to determine potentially desirable programs, said potentially desirable programs meeting the identified at least one specific selection criterion.

22. The television system of claim 21, wherein said displayable list of selection criteria is selected from the group consisting of performer, director, film location, series, individual program, category, and cinematography.

23. The television system of claim 21, wherein said data processor is configured to generate a second displayable list of selection criteria in response to the identification of said specific selection criterion, wherein said second displayable list of selection criteria is a subset of said identified specific selection criterion.

24. The television system of claim 21, wherein said data processor is configured to generate a display of said potentially desirable programs.

25. The television system of claim 21, wherein said data processor is configured to generate an alternate program guide in which said program listings representing said potentially desirable programs are distinguishable from said program listings not representing said potentially desirable programs.

26. The television system of claim 21, wherein said data processor is configured to compile and store said identified specific selection criterion in said database each time a specific program listing is designated as a favorite program.

27. The television system of claim 26, wherein said compiled and stored selection criterion is correlated to a specific user.

28. The television system of claim 21, wherein said data processor is configured to record said potentially desirable program on a VCR coupled to said television system.

29. A television system comprising:

a data processor coupled to said television system;

a database coupled to said data processor, said database containing a program guide, said program guide containing a plurality of program listings, wherein each program listing of said program guide is characterized by an independent set of program features, said program features stored in said database;

a screen coupled to said television system capable of displaying said program guide; and a user input device coupled to said data processor for designating a specific program listing as a favorite program to set the specific program listing to a first selection criterion, wherein said data processor, in response to the designation of the favorite program and setting the first selection criterion, is configured to compare said set of program features corresponding to the favorite program as a second selection criterion with said set of program features corresponding to each of said program listings in said program guide to determine potentially desirable programs, said potentially desirable programs having at least one program feature of said set of program features in common with at least one program feature of said set of program features corresponding to the favorite program.

30. A television system comprising:

a data processor coupled to said television system;

a data base coupled to said data processor, said database containing a program guide, said program guide containing a plurality of program listings, wherein each program listing of said program guide is characterized by an independent set of program features, the program features stored in said database;

a screen coupled to said television system capable of displaying said program guide; and a user input device coupled to said data processor, the user input device capable of setting a program listing from the plurality of program listings to be a first selection criterion;

wherein the data processor, in response to the setting of the first selection criterion, determines a second selection criterion and the user input device capable of inputting at least one program feature from the second selection criterion;

wherein the second selection criterion is from the group consisting of performer, director, producer, title, film location, and year of release;

wherein the data processor is configured to compare the at least one program feature with the set of program features corresponding to each of the program listings in the program guide to determine potentially desirable programs, said potentially desirable programs having at least one program feature of the set of program features in common with the at least one program feature.

31. The television system of claim 30, further comprising an alpha-numeric keypad for entering a specific name associated with each of said desired program features, said data processor configured to compare a portion of said entered specific name to said database, said database containing a plurality of names associated with said program features characterizing said plurality of program listings, wherein said data processor generates a display of said program listings in which at least a portion of one of said names associated with said program features which characterize said displayed program listing is equivalent to said portion of said entered specific name.

* * * * *